United States Patent [19]

Motoda

[11] Patent Number: 4,588,341
[45] Date of Patent: May 13, 1986

[54] ARTICLE DELIVERY APPARATUS
[75] Inventor: Kenro Motoda, Tokyo, Japan
[73] Assignee: Motoda Denshi Kogyo Kabushiki Kaisha, Tokyo, Japan
[21] Appl. No.: 624,046
[22] Filed: Jun. 25, 1984
[30] Foreign Application Priority Data Jul. 8, 1983 [JP] Japan .................................. 58-123395
Sep. 2, 1983 [JP] Japan .................................. 58-161567

[51] Int. Cl.$^4$ ............................................. B65G 60/00
[52] U.S. Cl. ........................................ 414/32; 414/37; 414/97; 414/331; 414/417
[58] Field of Search ...................... 414/32, 37, 97, 331, 414/417

[56] References Cited

U.S. PATENT DOCUMENTS

| | | | |
|---|---|---|---|
| 2,251,197 | 7/1941 | Nestmann | 414/32 X |
| 3,308,977 | 3/1967 | Cochran et al. | 414/417 X |
| 3,583,579 | 6/1971 | Triggs et al. | 414/37 X |
| 4,373,846 | 2/1983 | Charbonnet | 414/417 X |

FOREIGN PATENT DOCUMENTS

| | | | |
|---|---|---|---|
| 1152667 | 8/1963 | Fed. Rep. of Germany | 414/32 |
| 57-137230 | 8/1982 | Japan | 414/37 |
| 735531 | 5/1980 | U.S.S.R. | 414/787 |

Primary Examiner—Leslie J. Paperner
Attorney, Agent, or Firm—Lackenbach Siegel Marzullo Presta & Aronson

[57] ABSTRACT

An article delivery apparatus comprising a main body and an article carrier formed essentially of stack of trays holding articles thereon. The main body has at least one tray loading portion for unloadably loading the carrier therein and a shifting mechanism for circulating the trays within the main body through an article delivery position where the articles on the tray are delivered to for example a working robot.

14 Claims, 21 Drawing Figures

ARTICLE DELIVERY APPARATUS

BACKGROUND OF THE INVENTION

1. Field of the Invention

This invention relates to an article delivery apparatus which is capable of carrying out article delivery operation effectively between a tray holding articles such as products, intermediate products, parts, etc. thereon and a working station in a factory etc.

2. Description of the Prior Art

In the manufacturing line or processing line of a factory, tedious handling operations such as delivery, loading or unloading of parts, intermediate products or finished products are repeatedly carried out. These operations require tremendous time and effort.

In this connection, it is to be noted that to effectively use an industrial robot in small scale manufacturing of articles of different kinds, it is necessary to provide a peripheral equipment having flexibility. However, there has not yet been provided such flexible peripheral equipment which can effectively operate with the industrial robots. Heretofore, belt conveyors are used to deliver articles to the robots or receive articles from the robots. Such belt conveyors require rather large scale installations. In addition, such belt conveyors are not suitable for carrying out precise and positive article delivery in relation with robots.

3. General Background of the Invention

It is therefore a first consideration of the present invention to provide an article delivery apparatus which is capable of carrying out large amount of articles to or from robots accurately and positively.

It is a second consideration of the present invention to provide an article delivery apparatus which is capable of accurately and positively carrying out delivery of various kinds of articles to or from robots.

It is a third consideration of the present invention to provide an article delivery apparatus which is capable of accurately and positively carrying out article delivery between working stations of various manufacturing or processing lines.

It is a further consideration of the present invention to provide an article delivery apparatus which is capable of handling articles properly.

It is a still further consideration of the present invention to provide an article delivery apparatus which can be installed easily at a reasonable cost.

DESCRIPTION OF PREFERRED EMBODIMENT

Figure 1:
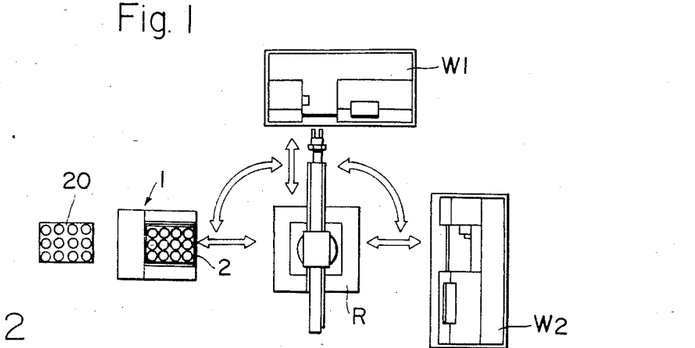
FIG. 1 is a schematic plan view of an article delivery apparatus of the present invention, showing the application thereof.

The article delivery apparatus of the present invention is used for example in a manner as illustrated in FIG. 1. Stated more specifically, a working robot R is positioned in the vicinity of a machine such as a manufacturing machine or processing machine W1, W2 and the article delivery apparatus 1 of the present invention is placed in association with the working robot R. In the example as illustrated, articles in an article carrier 2 are sequentially supplied by an operation system of a main body of the article delivery apparatus 1 to an article delivery position so that the working robot R may take up the articles sequentially to feed them to the machine W1, W2. Alternatively, in case the articles are conveyed by a belt conveyor or the like on the production line, the working robot R may take the articles on the conveyor into the article carrier 2 of the apparatus 1. Thus, the article delivery apparatus of the present invention can be used for delivery of articles and taking in of the articles.

Figure 2:
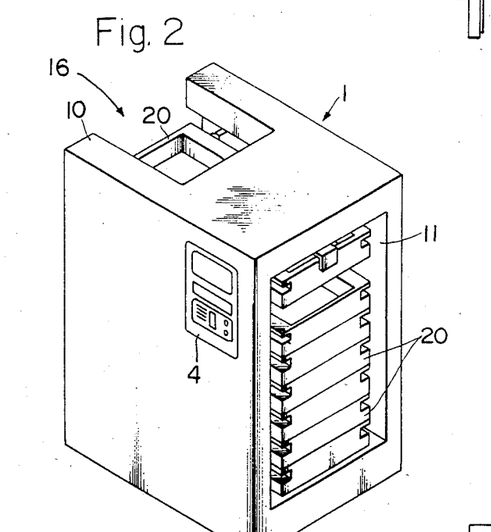
FIG. 2 is a perspective view of one form of article delivery apparatus according to the present invention.

FIG. 2 illustrates a general arrangement of the article delivery apparatus according to the present invention. An article carrier including a stack of trays 20 is disengageably loaded in a tray loading portion 11 of a main body 10. The tray 20 located at the uppermost position of the stack is fed to an article delivery position 16 where automatic article delivery is attained between the apparatus 1 and a working robot. 4 is an operation control panel for automatically shifting the trays in the apparatus.

Referring now to FIGS. 3 to 10, there is illustrated a first embodiment of the present invention.

Figure 3:
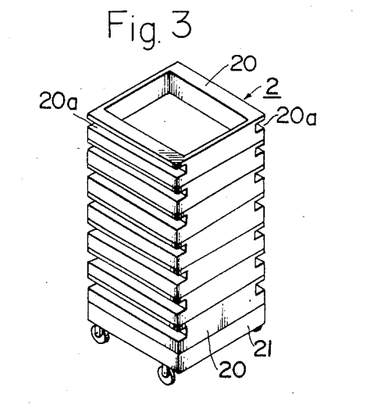
FIG. 3 is a perspective view of an article carrier employable in the apparatus of FIG. 2.

FIG. 3 is a perspective view of an article carrier employed in the first embodiment. The article carrier 2 of this embodiment is formed of seven trays stacked in the vertical direction. However, the number of the trays stacked may be changed according to the size of an article delivery apparatus 1. The trays 20 holding articles thereon are transported in the form of the article carrier 2 between working stations where they are required. The article carrier 2 is transported for example by a truck 21. The article carrier 2 may be transported between different factories according to necessity.

Each of the trays 20 may be a shallow container opened at the top thereof and having at the bottom thereof a stepped portion 20b which is engaged with the lower tray 20 to ensure the alignment of the trays and form a rigid stack of the trays 20. Alternatively, projections may be provided at the corners of the bottom or upper periphery of the trays to stably hold the trays in position. Or, such projections or stepped portion may be omitted as the case may be. The trays 20 each have, on the sides thereof, recessed portions for receiving engaging members 13, 14 or 15 as will be described later. The configuration of the tray 20 is not limited to that as illustrated and it may be selected according to necessity. Therefore, commonly available palettes or plastic containers may be employed. An article receptacle member 22 having article holding portions 22a formed of expanded plastics such as expanded polystyrene and conformed with the shape of the article may be placed in the tray 20. In this case, the articles may be located properly in the article holding portions to make the automatic article delivery operation of the working robot R easier. The article receptacle member 22 and the tray 20 may alternatively be made integrally with each other.

An article delivery apparatus 1 having a main body 10 provided with a tray loading portion 11 and a tray shifting means 3 will now be described.

The main body 10 of the apparatus 1 is located in the vicinity of the working station in a factory etc. The main body 10 has a generally box-shaped form and provided with the tray loading portion 11 having a space for encasing the article carrier, namely a stack of trays 20 and a base 12 for supporting the stack of trays and the tray shifting means 3 mounted in relation with the tray loading portion 11.

The stack of trays 20 is normally mounted on the truck 21 as illustrated in FIG. 3 and shifted from the truck 21 onto the base 12 of the main body 10. The stack of trays may alternatively be put onto the base 12 together with the truck 21 or the stack of trays may be transported by a forklift truck etc. without using the truck 21.

The tray loading portion 11 of the main body 10 has a space for receiving and unloading the stack of trays as described above and as illustrated in FIGS. 4 and 5. For this reason, the space has an opening at one end of the main body 10 so as to allow the stack of trays to be loaded into the space therethrough.

The stack of trays is placed on the base 12 in the loading portion 11 and moved stepwise up and down together with the base 12 by a lift means 31.

The shifting means 3 provided in the main body 10 of the apparatus 1 comprises essentially an upper lateral shifter 32, a lower lateral shifter 33, the first lift means 31 and a second lift means 34. The main body 10 is further provided with engaging members 13, 14 and 15 operated in association with the shifting means 3. The engaging members 13 and 14 are provided at upper and lower portions of the loading portion of the main body 10 and the engaging members 15 are provided at an article delivery portion 16 formed at an upper portion of the main body 10. Each of the engaging members 13, 14 and 15 are retractably projected from the inner face of the side of the main body 10 so as to engage with the recessed portion 20a of the side of the tray 20 to support the tray 20. The shifting means 3 and the engaging members 13 to 15 are operated according to the instructions from the control unit 4.

Figure 6:
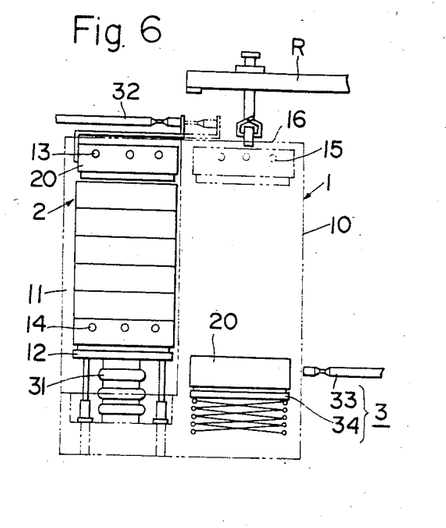
FIG. 6 is a side view of the apparatus of FIG. 2.
Figure 7:
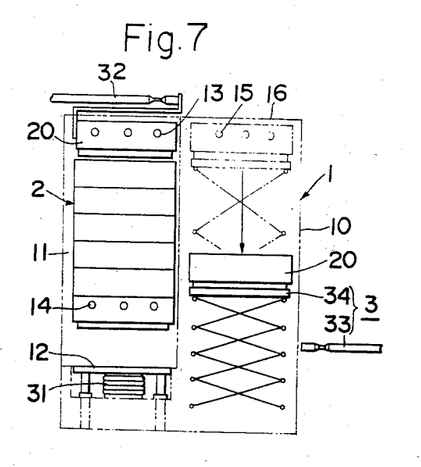
FIG. 7 is a similar side view of the apparatus of FIG. 2.

The upper shifter 32 comprises a cylinder having a stroke corresponding to the length of one tray 20 and a hook pusher and operates to laterally shift the tray 20 supported by the upper engaging members 13 from the position of the upper portion of the loading portion 11 to the engaging members 15 of the article delivery portion 16 of the body 10 as illustrated in FIG. 6. Thus, the engaging members 13 functions as auxiliary means of the lateral shifter 32.

The tray 20 supported by the engaging members 15 of the article delivery portion 16 is subjected to the article delivery operation in relation with the working robot R. Thereafter, the tray 20 is lowered by the second lift means 34 to a position adjacent to the lower lateral shifter 33.

The second lift means 34 is formed of a base member and a folding arm fixed to the base member and it moves up and down between the upper end and the lower end of a space formed in the main body 10 adjacent to the loading portion 11 so as to receive the tray 20 located at the article delivery portion 16 when the tray 20 is released from the engagement with the engaging members 15 and shift it to the lowermost position.

In the embodiment as illustrated, an extra tray 20 is provided within the main body 10 other than the stack of trays so that after completion of one cycle of the article delivery operation with respect to all the trays, i.e., seven trays in the embodiment, the stack of trays may be replaced with another fresh stack of trays while the extra tray 20 is subjected to the article delivery operation. Thus, the operation efficiency can be improved. The engaging members 15 may be omitted if the lift means 34 receives the tray 20 directly from the upper engaging members 13.

The lower lateral shifter 33 is formed of a cylinder having a stroke corresponding to the length of one tray 20 and acts to laterally shift the tray 20 on the second lift means 34 located at the lowermost position onto the base 12 on the first lift means 31. At this time, the stack of trays is supported by the lower engaging members 14 and the base 12 is free from the stack of trays.

The lift means 31 is formed of the base 12 and a pneumatic spring and provided at the bottom portion of the tray loading portion 11. The lift means 31 is raised by a distance corresponding to the height of one tray 20 to engage the uppermost tray 20 with the engaging members 13 when the stack of trays is loaded in the loading portion 11 of the main body 10 and then the lift means 31 is lowered by a distance corresponding to the height of the stepped portion 20b to engage the lowermost tray 20 with the lower engaging members 14 as illustrated in FIG. 6. The lift means 31 is then lowered to the bottom face of the loading portion 11. In this state, the tray which has completed the article delivery operation is lowered by the second lift means 34 to the lowermost position and shifted from on the lift means 34 onto the first lift means 31 which is now free from the stack of trays by the lower shifter 33. This operation is repeated to accomplish one cycle of tray circulation or shifting.

The operation of the article delivery apparatus 1 will now be described.

The main body 10 of the article delivery apparatus 1 is first located at an operating station and the article carrier 2 with the stack of trays 20 holding articles to be delivered to the station is transported to the station and the stack of trays is loaded to the loading portion 11 of the main body 10. The shifting means 3 is then operated in response to the instructions from the control unit 4 as follows. The lifting means 31 is raised to engage the uppermost tray 20 with the upper engaging members 13 with the remaining trays of the stack being supported by the lower engaging members 14. The uppermost tray 20 is laterally fed by the upper lateral shifter 32 so as to be supported by the engaging members 15 of the article delivery portion 16. In this state, the desired article delivery is accomplished with reference to the working robot R. The tray 20 after completion of the article delivery operation is lowered by the second lift means 34 and then laterally shifted by the lower lateral shifter 33 onto the first lift means 31. The first lift means 31 is moved upwardly to lift the tray 20 so as to engage it with the lower engaging members 14. These operations are repeated for all the trays 20 of the stack. Thus, article delivery operation is completed with respect to all the trays of the stack loaded in the tray loading portion 11 of the main body 10. These operations may be applied to the article loading operation, i.e. the operation for receiving articles from the robot R onto the trays. The stack of trays which has completed such article delivery or article loading operation is unloaded from the main body 10 of the apparatus 1 and another fresh stack of trays is loaded thereinto.

Figure 4:
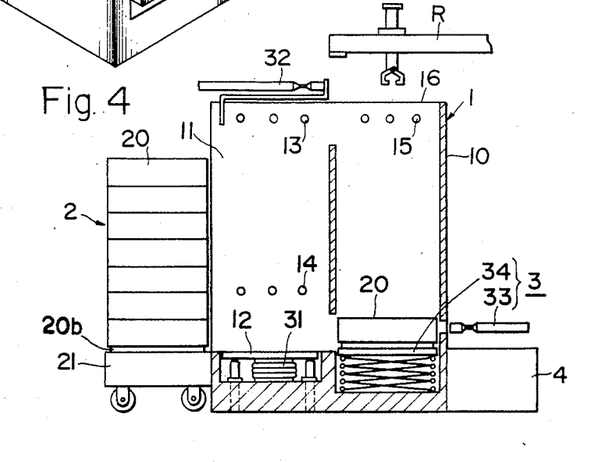
FIG. 4 is a vertical sectional view of the apparatus of FIG. 2.
Figure 5:
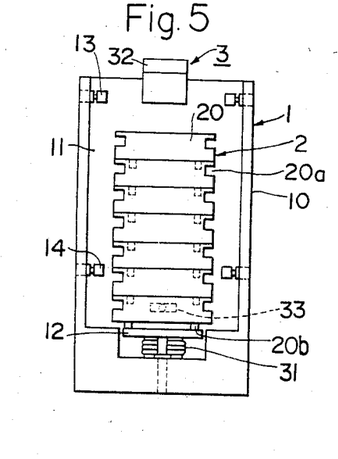
FIG. 5 is a front view of the apparatus of FIG. 2.

The article delivery or loading operation may be carried out manually without using the working robot R. The circulation of the trays 20 may be effected reversely in such a manner that the tray 20 located on the second lift means 34 is raised by the lift means 34 to the article delivery portion 16 and then shifted by a lateral shifter 32 to the uppermost position of the stack. In this case, the lower engaging members 14 engage with the second tray from the bottom and the upper and lower lateral shifters have means for drawing or sucking the tray. Alternatively, the shifters may be provided at positions opposite to the positions as illustrated in FIGS. 4 and 6. The lift means 31 and 34 are not limited to those as illustrated in the drawings and they may be any type of lift means having a function of raising and lowering the trays such as a combination of a base plate and a cylinder. If the stepped portion 20b of the tray 20 is omitted, the tray 20 may be laterally shifted by the shifter 32 without the engaging members 13.

Figure 8:
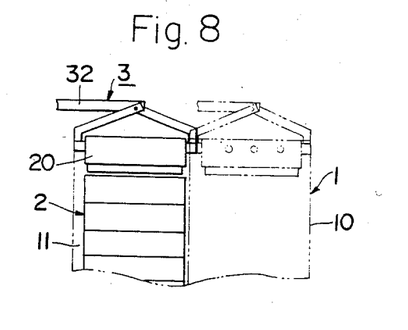
FIGS. 8 and 9 are side views of other forms of upper lateral shifters employable in the apparatus of FIG. 2.
Figure 9:
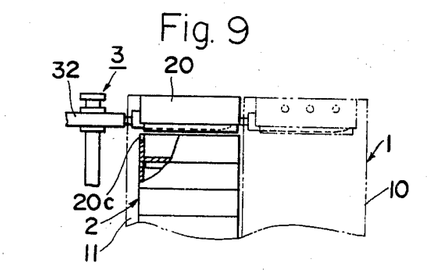

FIGS. 8 and 9 illustrate other forms of shifter 32. The shifter 32 of FIG. 8 is adapted to hold the uppermost tray 20 and raise the same a bit to disengage it from the lower tray and laterally move the tray so as to engage it with the engaging members 15 of the article delivery portion 16. In this case, the upper engaging members 13 may be omitted. If the lift means 34 is adapted to receive the tray 20, the engaging members 15 may also be omitted.

In FIG. 9, each of the trays 20 has a notch 20c at an upper portion of the front face thereof. The notch 20c and the bottom face of the upper tray 20 together form a hole shaped portion where the tip end of the upper lateral shifter 32 can be placed. The shifter 32 can thus be positioned just under the bottom face of the upper tray 20 to raise the tray a bit so as to disengage it from the next or second tray and the shifter 32 laterally shifts the tray to the article delivery portion 16.

Figure 10:
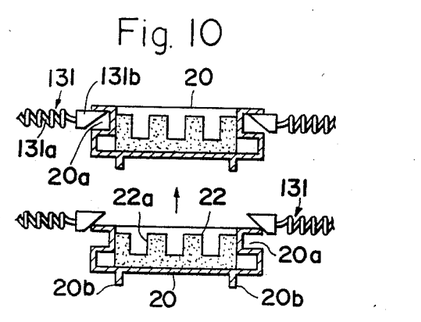
FIG. 10 is a side view of another form of engaging member employable in the apparatus of FIG. 2.

FIG. 10 illustrates another form of the engaging members. In this case, the engaging members 13 each comprise springs 131a and wedge members 131b. The wedge members 131b engage with the recessed portions 20a of the tray 20 to support it but they disengage from the tray due to the wedge form of the members 131b against the action of the springs 131a when the lower tray is raised. The lower tray is then engaged with the wedge members 131b and held by them in cooperation with the springs 131a. In this case, it is not necessary to control the operation of the engaging members by the control unit 4. The engaging members may alternatively be angle members retractably engageable with the recessed portion 20a of the tray 20, or they may be adapted to engage with the bottom of the tray or pressingly hold the sides of the tray. In the latter case, the recessed portion 20a may be omitted.

Figure 11:
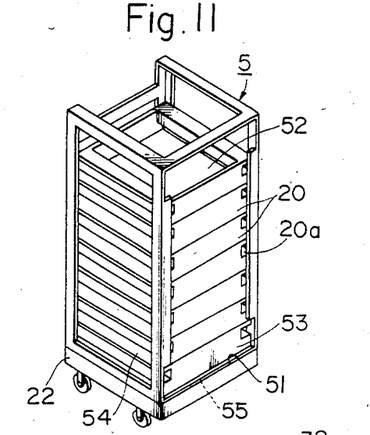
FIG. 11 is a perspective view of another form of article carrier.
Figure 12:
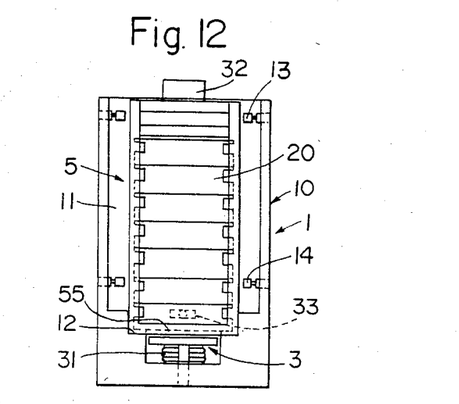
FIG. 12 is a front view of an article delivery apparatus employing the article carrier of FIG. 11.

FIGS. 11 and 12 illustrates a second embodiment of the present invention. The same or similar parts and portions are denoted by the same or similar numerals as in the first embodiment and the description thereof is omitted here.

FIG. 11 is a perspective view of an article carrier employed in this embodiment. The article carrier of the present embodiment is formed of a frame 5 and a stack of trays 20. The stack of trays 20 is encased in the frame 5 and placed on a base 51 of the frame 5. The height of the frame is such that there is a space corresponding to a height of one tray 20 above the stack of trays 20 when the stack is mounted in the frame 5. Or, such a space may be omitted as the case may be.

The frame 5 has an upper opening 52 and a lower opening 53 on one side of the frame 5 so that the tray 20 may be circulated by taking out the tray 20 through the upper opening 52 and feeding it again through the lower opening 53. The frame 5 has side openings 54 and a lower opening 55 so as to allow a shifting means as will be described later to act on the trays 20 through the frame 5. The trays 20 are substantially the same as those of the first embodiment but the stepped portion 20b may be omitted in this embodiment because the trays 20 can be stably held in the stacked state in the frame 5.

A main body 10 of an article delivery apparatus 1 is located in the vicinity of a working station. The article carrier is loaded on a base 12 of a tray loading portion of the main body 10. A shifting means 3 is provided in the main body 10 of the apparatus 1 in association with the article carrier. The shifting means 3 consists essentially of an upper lateral shifter 32, a lower lateral shifter 33, a first lift means 31 and a second lift means (not shown). The lower lateral shifter 33 operates in cooperation with the lift means 31 and engaging members 14 and the upper lateral shifter 32 operates in cooperation with engaging members 13.

The second lift means is formed of a base and a folding arm connected to the base and adapted to move up and down between the upper opening 52 and the lower opening 53. The first lift means 31 is formed of a base and a pneumatic spring connected to the base and provided at a lower portion of the loading portion 11. The lift means 31 acts on the trays 20 through the bottom opening 55 of the frame 5 to move the stack of trays up and down.

Since there is a space corresponding to the height of one tray in the frame 5, the stack of trays is lifted by a distance corresponding to the height of one tray by the lift means 31. At this time, the engaging members 13 and 14 are actuated to engage with the uppermost tray and the lowermost tray, respectively. The engaging members 13 and 14 each has an engaging tip connected to a cylinder and retractably extends towards the tray 20 through the side opening 54 to engage with a recessed portion 20a of the tray 20 according to the instructions from the control unit 4. When the lowermost tray is engaged with the engaging members 14, the tray supports all the trays above it but the uppermost one. In this state, the lift means 31 is lowered by a distance corresponding to the height of one tray to form a space for one tray at the bottom portion of the frame 5. The lower engaging members 14 are provided at positions corresponding to the second tray from the bottom.

The tray located at the uppermost position of the stack is moved by the lateral shifter 32 to an article delivery position 16 through the upper opening 52. The tray is subjected to an article delivery operation in relation with a working robot R.

On the second lift member there is mounted an extra tray, which is fed by the lower shifter 33 through the lower opening 53 into the lower space in the frame 5. Then, the lift means 31 is again actuated to raise the whole stack of trays by one step so as to engage the uppermost and the lowermost trays with the engaging members 13 and 14. Prior to the raising of the lift means 31, the engaging members 13 and 14 are once disengaged from the trays. After the raised trays are engaged with the engaging members 13 and 14, the lift means 31 is lowered. At this time, the trays located at the article delivery position 16 is received on the second lift means and the engagement by engaging members at the article delivery position is released to allow the lift means to be lowered for feeding the tray thereon to the lower space of the frame 5.

Figure 13:
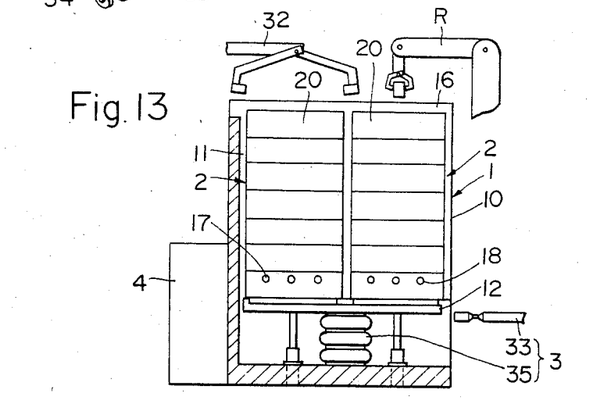
FIG. 13 is a vertical sectional view of another article delivery apparatus according to the present invention.
Figure 14:
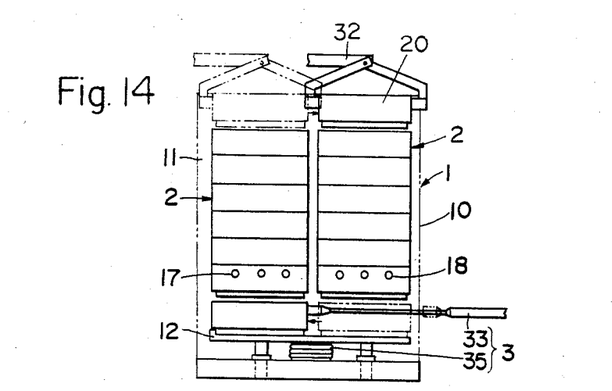
FIG. 14 is a similar view showing the apparatus in operation.

FIGS. 13 and 14 illustrates a third embodiment of the present invention which is substantially the same as the first embodiment except for two stacks of trays are mounted in a main body of an article delivery apparatus.

The main body 10 of the article delivery apparatus 1 according to the present embodiment has a tray loading portion 11 having a space for encasing two stacks of trays therein. The trays 20 are substantially the same as those employed in the first embodiment. The two stacks of trays are mounted on a base 12 of the tray loading portion 11 and moved stepwise up and down by a lift means 35 together with the base 12. A shifting means 3 provided in the main body 10 of the apparatus 1 comprises an upper lateral shifter 32, a lower lateral shifter 33, and the lift means 35. The main body 10 is further provided with engaging members 17 and 18 which operates in association with the shifting means 3. The constructions of the engaging members 17 and 18 are substantially the same as those employed in the foregoing embodiments.

The lift means 35 includes a pneumatic spring connected to the base 12 and provided at the bottom portion of the tray loading portion 11. When the forward and rearward stacks of trays are mounted on the base 12, the lift means 35 is raised to lift the stacks of trays so as to locate the uppermost tray of the forward stack of trays at an article delivery position 16 for allowing the article delivery operation in relation with a working robot R. The lift means 35 is then lowered by a distance corresponding to the height of one tray 20 with the rear stack of trays being supported by the rear engaging members 17 and the trays of the forward stack above the second one from the bottom being supported by the forward engaging members 18. The lift means 35 is thus lowered with only the lowermost tray 20 of the forward stack being left on the base 12. The lowermost tray 20 of the forward stack is fed rearwardly by the lower shifter 33. On the other hand, the uppermost tray 20 of the rear stack is placed to the uppermost position of the forward stack of trays by the upper shifter 32. The article delivery portion 16 is provided at the uppermost position of the forward stack of trays so that the said tray is subjected to the article delivery operation in relation with the working robot R. At the same time, the tray 20 fed rearwardly by the lower shifter 33 is raised by the lift means 35 so as to be engaged with the engaging members 17. These operations are repeated for the respective trays 20 to complete the desired article delivery operations of the trays.

Figure 15:
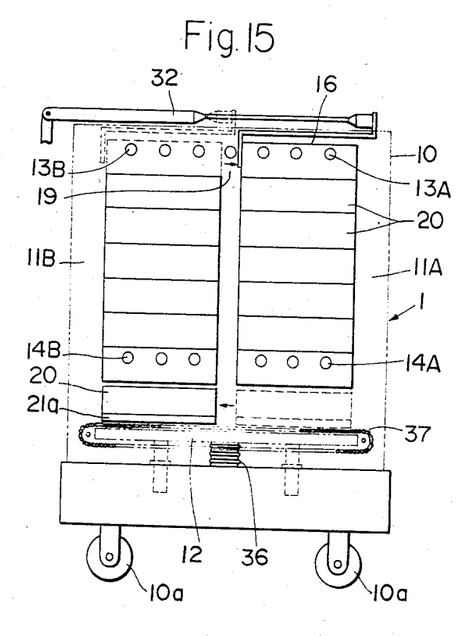
FIG. 15 is a still further form of article delivery apparatus embodying the present invention.

FIG. 15 illustrates a fourth embodiment of the present invention. In this embodiment, a main body 10 of an article delivery apparatus 1 has two tray loading portions 11A and 11B for receiving therein stacks of trays 20, respectively. The main body 10 is provided with mobile means such as casters 10a and can be moved to a desired working station. The trays used in the present embodiment are substantially the same as those employed in the foregoing embodiments.

At the upper portions of the loading portions 11A and 11B is provided a communicating passage 19 for allowing the tray 20 to be shifted from one loading portion 11B to another loading portion 11A, and at the upper portion of the loading portion 11A is provided an article delivery portion 16. Similarly, at the lower portions of the loading portions 11A and 11B is provided a communication space for letting the tray 20 to be shifted from the loading portion 11A to the loading portion 11B.

An upper lateral shifter 32 is formed for example of a pusher and a cylinder and is actuated, in response to the instructions from a control unit, to shift the tray 20 supported by upper engaging members 13B in the loading portion 11B to upper engaging members 13A in the loading portion 11A through the communication passage 19 when the engaging members 13A are not occupied.

A lower lateral shifter 37 is formed of chain conveyors spaced from each other. A lift means 36 is formed of a pneumatic spring, a base 12 and a plate 21a placed on the base 12. The base 12 is provided at the bottom portions of the loading portions 11A and 11B so as to extend therebetween and adapted to be moved up and down in the space between the chain conveyors.

When the base 12 with the plate 21a is raised, the stack of trays 20 are raised and the engagement of the engaging members 13A and 14A are released. Then, the base 12 is lowered by a distance corresponding to the height of one tray 20 and the engaging members 13A and 14A are brought into engagement with the trays. In this state, the upper portion of the loading portion 11A is not occupied by the tray and the lower engaging members 14A engage with the second tray from the bottom. When the base 12 is further lowered, the lowermost tray is placed on the plate 21a and put on the chain conveyors 37. Then the tray is conveyed to the loading portion 11B by the conveyor. At this time, the upper lateral shifter 32 is actuated to shift the tray located at the uppermost position in the loading portion 11B to the unoccupied space at the upper portion of the loading portion 11A. The base 12 is again lifted to raise the trays 20 thereon to bring the uppermost tray of the stack into engagement with the upper engaging members 13B and the lowermost tray of the stack into engagement with the lower engaging members 14B. These operations are repeated to circulate the trays within the main body of the apparatus. During the circulation of the trays, the article delivery operation is carried out between the article delivery portion 16 and a working robot provided outside of the apparatus.

Figure 16:
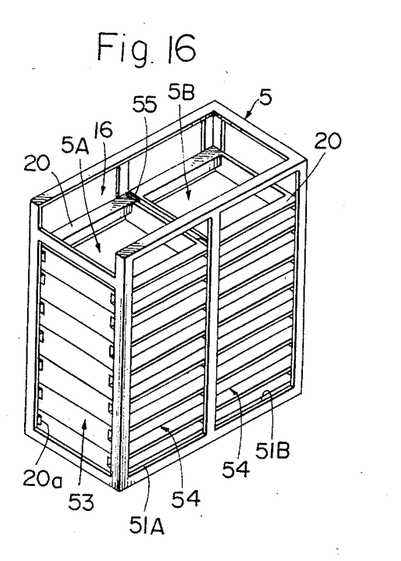
FIG. 16 is a perspective view of a further form of article carrier.
Figure 17:
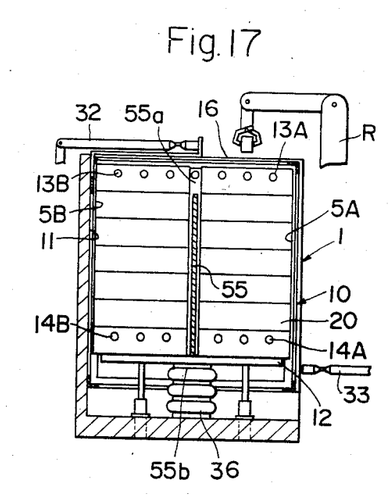
FIG. 17 is a vertical sectional view of an article delivery apparatus employing the article carrier of FIG. 16.

FIGS. 16 and 17 illustrate a fifth embodiment of the present invention. In this embodiment, a tray carrier is formed of a frame 5 having two tray loading portions 5A and 5B in which two stacks of trays 20 are placed on base portions 51A and 51B thereof, respectively. In the state where the stacks of trays 20 are set in the respective loading portions 5A and 5B of the frame 5, there is a space sufficient to receive one tray therein at the upper portion of each of the loading portions. Alternatively, one of spaces may be omitted as the case may be. Between the loading portions 5A and 5B, there is provided a partition 55 which extends over the height of the stack of trays except for the uppermost and the lowermost trays so as to form communication passage 55A and 55B for the trays from one loading portion to another loading portion. The frame 5 further has an article delivery portion 16 at the upper portion of the loading portion 5A, and a bottom opening, side openings 54, and a front opening 53 so as to allow a shifting means to act on the trays 20.

The so constructed tray carrier is loaded in a body 10 of an article delivery apparatus 1 as illustrated in FIG. 17. The trays 20 are circulated within the frame 5 in a manner similar to that of the fourth embodiment except for a lower lateral shifter 33. The lower shifter 33 is analogous to the shifter 33 of FIGS. 13 and 14.

Figure 18:
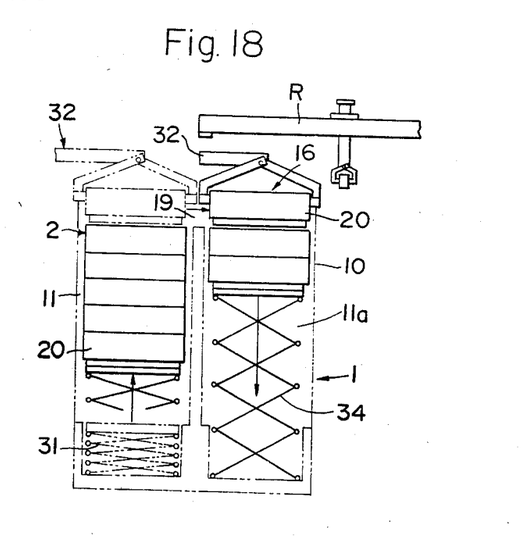
FIG. 18 is a schematic side view of a still further form of article delivery apparatus according to the present invention.

FIG. 18 illustrates a further embodiment of the present invention. In this embodiment, a main body 10 of an article delivery apparatus 1 has a tray loading portion 11 and a tray receiving portion 11a. A tray carrier comprising a stack of trays is loaded in the loading portion 11 of the main body 10 and the trays 20 are fed upwardly by a lift means 31. The tray 20 located at the uppermost position of the stack of trays is laterally moved by a lateral shifter 32 to an article delivery portion 16 provided at the uppermost position of the tray receiving portion 11a and received by a lift means 34 directly or through the trays received previously by the lift means 34. In this embodiment, a lower lateral shifter is omitted, so that the trays 20 received by the lift means 34 in the tray receiving portion 11a are not circulated but taken out from the main body after completion of the article delivery operation with respect to all the trays 20. In operation of the article delivery apparatus of this embodiment, the lift means 31 is raised step by step by a distance corresponding to the height of one tray 20 to sequentially feed the trays 20 to the uppermost position of the loading portion 11 while the lift means 34 is lowered step by step from the uppermost position of the portion 11a to receive the tray 20 fed from the uppermost position of the loading portion 11 of the main body 10.

Figure 19:
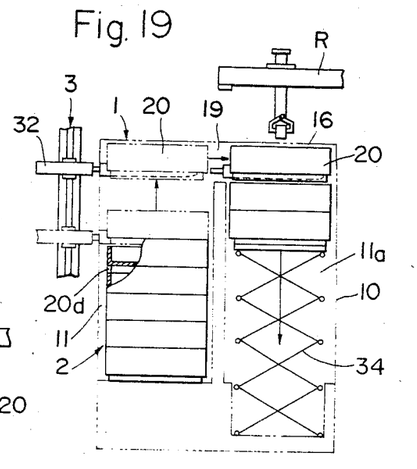
FIG. 19 is a schematic side view of a modification of the apparatus of FIG. 18.

FIG. 19 shows a modification of the embodiment of FIG. 18 wherein a lateral shifter 32 is movable in the vertical direction and the lift means 31 is omitted. The lateral shifter 32 is inserted into a space 20d between the uppermost tray and the second tray and raise the uppermost tray to the top position of the loading portion 11 as the lift means 31 is moved upwardly.

Figure 20:
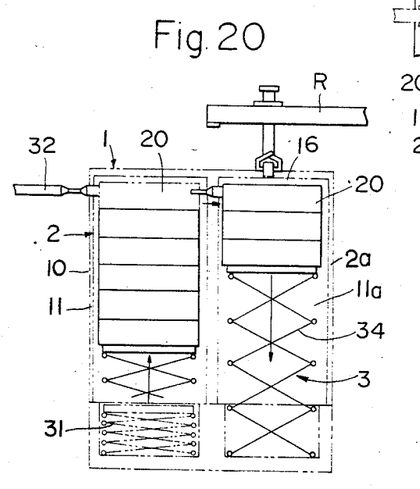
FIG. 20 is a schematic side view of a still further form of article delivery apparatus according to the present invention.

FIG. 20 shows a still another embodiment of the present invention. This embodiment is similar to the embodiment of FIG. 18 except that the type of a lateral shifter 32 is different from that of FIG. 18 and a tray receiving carrier 2a is mounted in a tray receiving portion of a main body 10 of an article delivery apparatus 1.

Figure 21:
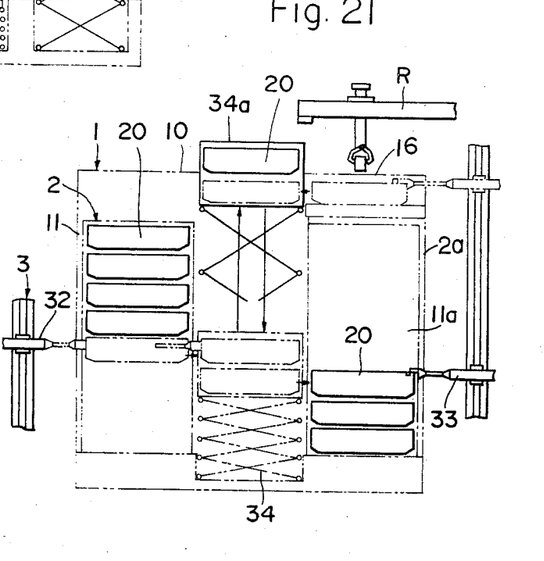
FIG. 21 is a schematic side view of a still further form of article delivery apparatus according to the present invention.

FIG. 21 illustrates a further embodiment of the present invention. In this embodiment, a main body 10 has a tray loading portion 11, a portion for providing a lift means 34 and a tray receiving portion 11a. A tray carrier 2 to be loaded in the tray loading portion 11 has a frame provided with shelves for holding trays 20 therein, respectively so that the trays may slide on the respective shelves separately from each other. A lateral shifter 32 is movable in the vertical direction so as to laterally feed a given tray into a tray support means 34a put on the lift means 34. The tray support means 34a is fixed to the lift means 34 so as to move up and down conjointly with the lift means 34. The tray or trays received by the tray support means 34a are raised to the uppermost position so as to be fed to an article delivery portion 16 of the main body 10 where a working robot R acts on the articles held on the trays. The tray completed the article delivery operation is put into a tray receiving carrier 2a placed in the tray receiving portion 11a. The tray receiving carrier 2a may of course be omitted. In this case, the trays after completion of the article delivery operation are stacked directly in the tray receiving portion 11a.

I claim:

1. An article delivery/receiving apparatus for delivering/receiving articles through the use of trays comprising, in combination, a main body adapted to be disposed in the vicinity of a working station in a factory and a carrier containing a stack of trays therein; and said main body including:
   a tray loading/unloading portion having a space for encasing said carrier, and where said carrier containing said stack of trays is loaded or unloaded,
   an article delivery/receiving portion formed at an upper portion of said main body to allow for cooperation with a working robot or the like, and being disposed in juxtaposition to said tray loading/unloading portion,
   a first lift means, for stepwise lifting said stack of trays, and being engageable with the lower most tray of said stack,
   an upper lateral means provided at said main body for laterally shifting a tray located at the uppermost position of said stack to said article delivery/receiving portion; and
   a second lift means, for stepwise lowering the shifted trays disposed at said article delivery/receiving portion so as to provide for the sequential and stepwise tray circulation within said main body of said apparatus and an article delivery/receiving operation which is repetitive for each sequence or cycle of tray operation.

2. An article delivery/receiving apparatus as claimed in claim 1, wherein said carrier further comprising trays stacked in the vertical direction and said trays being loadable/unloadable in said tray loading/unloading portion of said main body.

3. An article delivery/receiving apparatus as claimed in claim 1, wherein said carrier is composed of seven trays stacked up vertically and said trays are loadable in said tray loading portion of said main body; and said article delivery/receiving apparatus further including a second lateral shifting means for shifting a tray at the lower most portion of a stack of trays formed at said article delivery/receiving portion.

4. An article delivery/receiving apparatus as claimed in claim 3, further including a stack of successive trays in said delivery/receiving portion of said main body formed adjacent to said tray loading/unloading portion, each of said tray loading/unloading portions being provided adjacent said article delivery/receiving portions, said upper lateral feeding means being arranged to shift a tray located at the uppermost position of said tray loading/unloading portion to a vacated tray space in the delivery/receiving portion of said main body, and said second lateral shifting means comprises a lower lateral feeding means arranged to shift a tray located at the lowermost position of said delivery/receiving portion of said main body to a vacated tray space in said loading/unloading portion of said main body.

5. An article delivery/receiving apparatus as claimed in claim 4, wherein said carrier comprises trays which are stacked in the vertical direction so as to be loaded directly in said loading/unloading portion of said main body.

6. An article delivery/receiving apparatus as claimed in claim 5, wherein said main body is provided with wheels at the bottom thereof so as to be mobile.

7. An article delivery/receiving apparatus as claimed in claim 1, further including a lower lateral feeding means provided at said main body for laterally shifting the tray on said first lift means to said tray loading/unloading portion.

8. An article delivery/receiving apparatus as claimed in claim 7, wherein both of said lateral means for shifting comprises cylinder devices having a finite stroke generally corresponding in length to the length of a tray for laterally shifting said tray between the said portions of said apparatus.

9. An article delivery/receiving apparatus as claimed in claim 1, further including retractable engaging means at said tray loading/unloading portion of said main body, and at a tray delivery/receiving portion for supporting a tray during the operation of said apparatus.

10. An article delivery/receiving apparatus as claimed in claim 9, wherein said retractable engaging means are disposed at upper and lower portions of said loading/unloading portion of said main body, and at an upper portion of said delivery/receiving portion.

11. An article delivery/receiving apparatus as claimed in claim 9, wherein each of said engaging members comprises a spring and a wedge member, with said wedge member being engaged with a recessed portion in said trays for supporting a tray, and disengaging therefrom against the action of said spring when said tray is moved during a cycle of the article delivery/receiving operation.

12. An article delivery/receiving apparatus as claimed in claim 1, wherein said trays are of the type which are alignable when stacked atop each other.

13. An article delivery/receiving apparatus according to claim 1, wherein said main body includes a frame which maintains alignment of said stack of trays.

14. An article delivery/receiving apparatus as claimed in claim 1, wherein an extra tray is employed for operational efficiency in addition to said stack of trays so that upon completion of one cycle of operation with respect to all of the trays, said stack of trays can be replaced with another fresh stack of trays, while said extra tray is subject to an article delivery/receiving operation.

* * * * *